United States Patent [19]
Sanders

[11] Patent Number: 5,678,476
[45] Date of Patent: Oct. 21, 1997

[54] APPARATUS FOR THE UNIFORM DISTRIBUTION OF A FOOD PRODUCT OVER A SURFACE

[75] Inventor: Phillip L. Sanders, Floyds Knobs, Ind.

[73] Assignee: Food Equipment Engineering and Design, Inc., Jeffersonville, Ind.

[21] Appl. No.: 610,889

[22] Filed: Mar. 5, 1996

[51] Int. Cl.$^6$ ................................. A21C 9/04
[52] U.S. Cl. ................ 99/450.1; 99/494; 118/15; 118/24; 118/27
[58] Field of Search ................. 99/494, 450.1; 118/13, 15, 16, 24, 25, 27

[56] References Cited

U.S. PATENT DOCUMENTS

| | | | |
|---|---|---|---|
| 3,063,391 | 11/1962 | Johnston et al. | 118/13 X |
| 3,908,584 | 9/1975 | Raque | 118/16 X |
| 4,152,976 | 5/1979 | Kawasaki et al. | 99/494 X |
| 4,597,358 | 7/1986 | Aitken | 118/24 |
| 5,109,760 | 5/1992 | Ansari | 99/494 |

*Primary Examiner*—Reginald Alexander
*Attorney, Agent, or Firm*—Middleton & Reutlinger; Charles G. Lamb

[57] ABSTRACT

A food spreader, particularly for spreading cheese onto a pizza crust, includes a food feed hopper mounted above a food spreader housing having movable paddles therein and a porous bottom member spaced above the surface upon which the food is to be spread.

11 Claims, 4 Drawing Sheets

5,678,476

APPARATUS FOR THE UNIFORM DISTRIBUTION OF A FOOD PRODUCT OVER A SURFACE

BACKGROUND OF THE INVENTION

This invention relates to an apparatus for the distribution of a food product over a surface and more particularly to an apparatus for the uniform distribution of a food product, such as cheese, which is spread over a surface, such a flattened dough base for a pizza.

In the preparation of pizzas, particularly those which are commercially available in restaurants, cheese that is added to a pizza dough base are generally done by hand and the amount of uniformity in placing the cheese over the surface depends upon the skill of the worker applying the cheese. Needless to say, it is very difficult to get a very uniform distribution of the cheese over the entire pizza crust. There have been a number of devices tried to uniformly distribute the cheese over a pizza crust, but most have met with some obstacles.

SUMMARY OF THE INVENTION

An object of the present invention is to provide an apparatus for the uniform spreading of food products over a surface.

Another object of this invention is to provide a food product spreading apparatus which uniformly spreads the food product in a relatively short period of time so that the apparatus can be used in a high volume commercial operation.

Even another object of this invention is to provide an apparatus for spreading a predetermined, consistent volume of cheese over a pizza crust which requires minimal amount of skill of the worker operating the apparatus.

More particularly, the present invention provides an apparatus for the uniform distribution of a food product over a surface which comprises a food spreader housing spaced above a surface, such as a pizza crust, to receive food product, such as cheese, thereover. A food spreader housing is provided with an open top and a flat porous bottom-member with rotatable paddles mounted therein. Means for rotating the paddles is also provided as well a food feed hopper which is spaced above the open top of the food spreader housing for feeding the food into the food spreader housing.

Further objects and advantages of this invention will appear from the following description and appended claims, reference being had to the accompanying drawings forming a part of the specification wherein like reference characters designate corresponding parts into several views.

DETAILED DESCRIPTION OF THE PREFERRED EMBODIMENT

Figure 1:
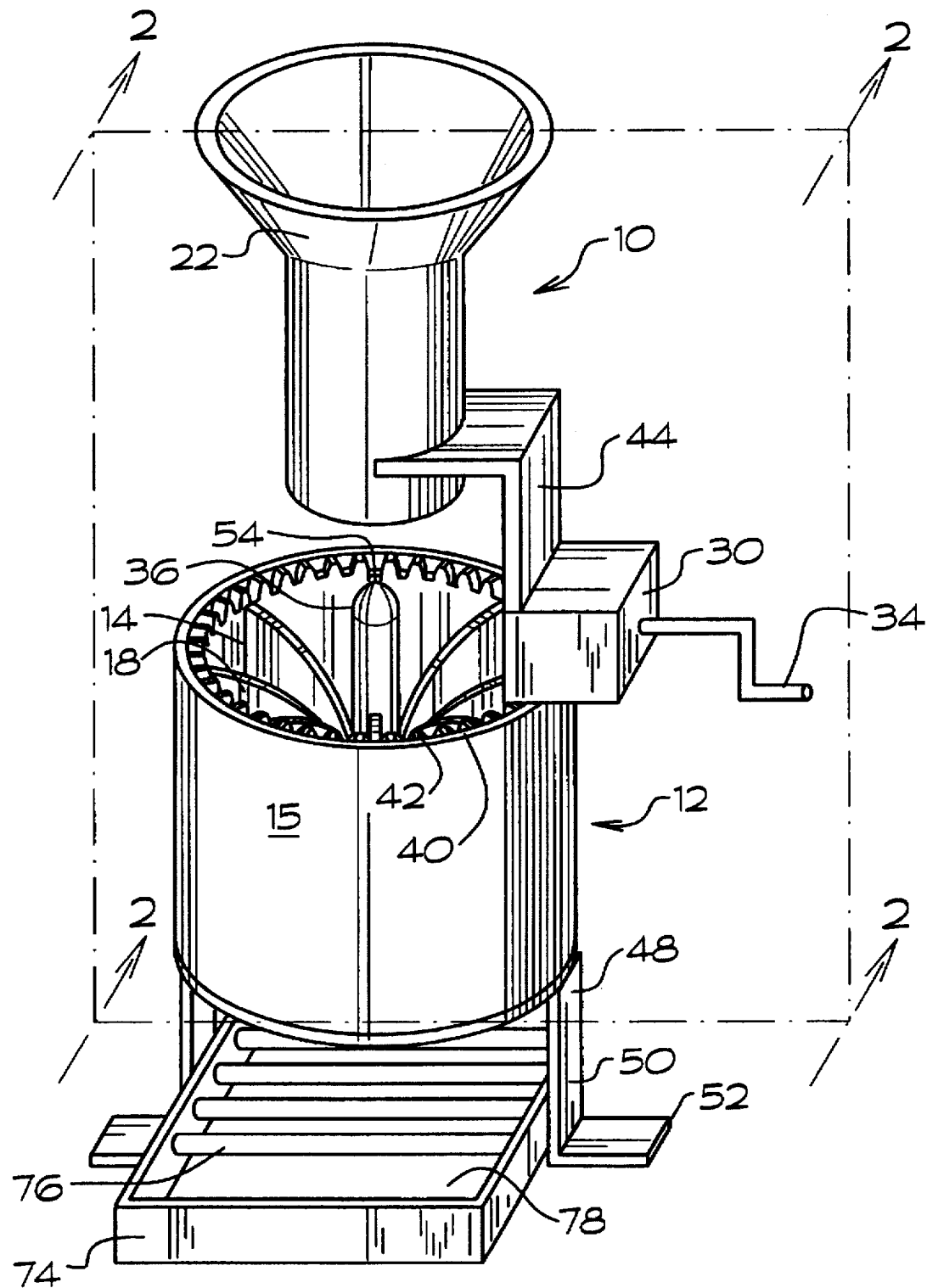
FIG. 1 is a perspective view of a preferred embodiment of the present invention.
Figure 2:
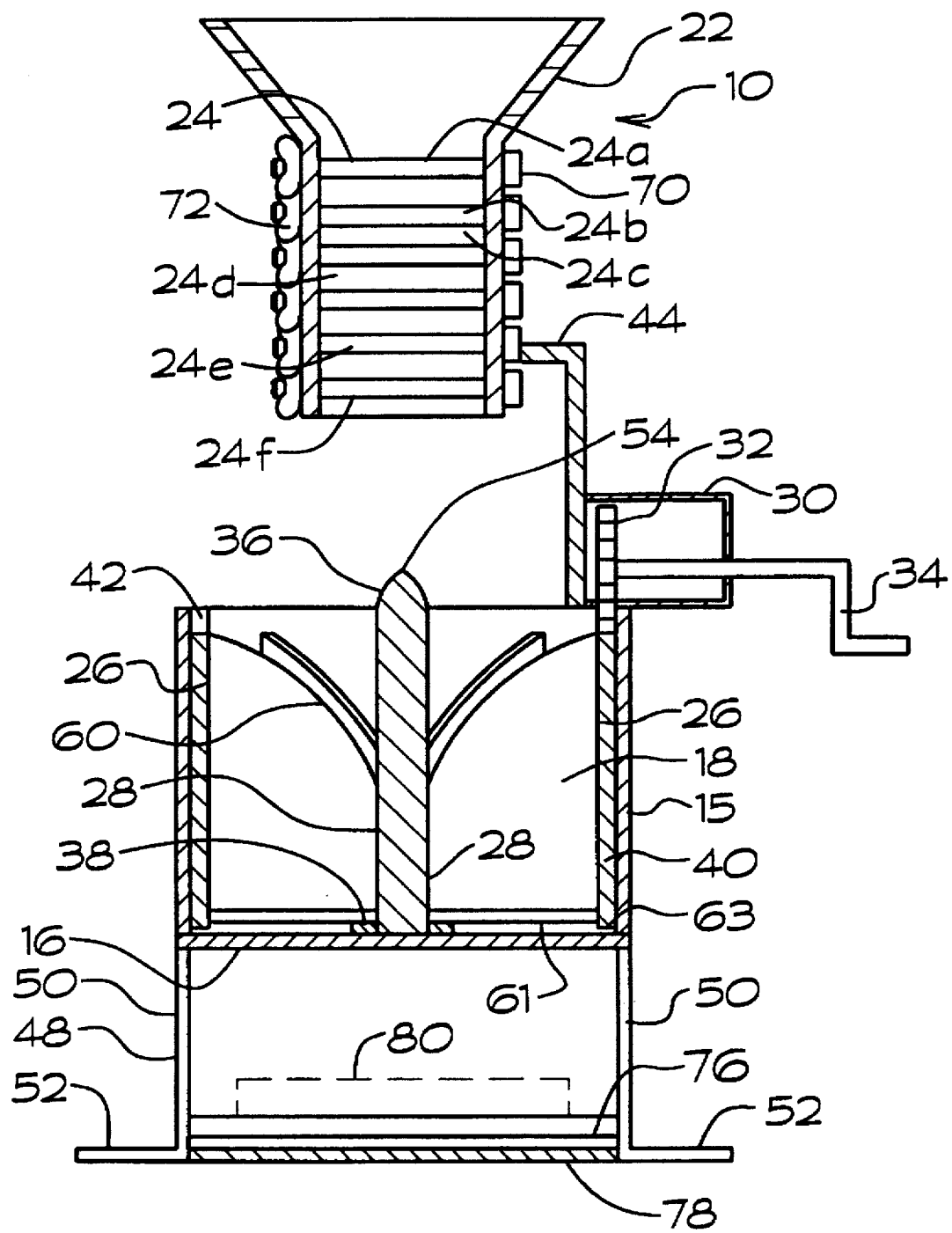
FIG. 2 is a sectional view taken along lines 2—2 of FIG. 1.

As best shown in FIGS. 1 and 2, an apparatus for the uniform distribution of a food product over a surface is identified by the numeral 10. Apparatus 10 includes a food spreader housing 12 which has an open top 14, a circumferential wall 15, and a porous bottom plate 16. Enclosed within the food spreader housing 12 is a circumferential ring 40 to which vertically extending paddles 18 are attached. Paddles 18, eight being shown, are spaced equal distance around the circumference of the housing 12 and are attached along their outer vertical edges 26 to the ring 40. The paddles 18 are also provided with inner vertical edges 28 which are attached to vertically mounted spindle 36, spindle 36 resting upon the porous bottom plate 16. The mounting spindle 36 is of a preselected diameter and is mounted upon the porous plate 16 with the lower portion of the spindle 36 circumscribed by a spacer 38 which receives or upon which edge 28 to the paddles 18 rests.

The movable circumferential ring 40 is provided with a lower terminating edge 63 which is spaced a preselected distance above the top surface of the porous plate member 16, said distance generally being approximately $\frac{1}{32}$ of an inch. Spacing between the edge 63 and the top surface of the porous plate member 16 is just enough so that the movable ring 40 does not rub against the porous plate member 16 as the movable ring 40 rotates.

The movable ring 40 is provided with an upper edge which includes a plurality of teeth 42 therealong. The movable ring 40 is moved in response to the turning of gear 32 in cooperating meshing relation with the teeth 42 along the upper edge of the circumferential ring 40. Gear 32 is housed within housing 30 and receives the shaft of a handle 34 therethrough wherein the turning of the handle 34 rotates the gear 32 which in turn moves the paddle ring 40.

Figure 6:
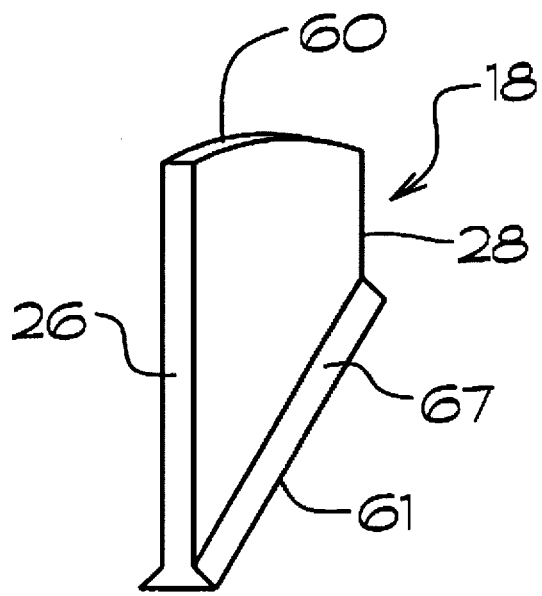

As noted previously, the rotatable paddles 18 are attached along their outer vertical edge 26 to the inner surface of the movable paddle ring 40 and inner vertical edges 28 are attached to the mounting spindle 36. As shown, the outer vertical edge 26 is of a length greater than the inner vertical edge 28 wherein the bottom edge 61 of the paddle connecting the outer vertical edge 26 and the inner edge 28 is in a horizontal plane. Bottom edge 61 is also in the same horizontal plane with terminating edge 63. The top edge of the paddle 18, identified by the numeral 60, is at a downward incline from the outer edge 26 to the inner edge 28 so as to assist in the distribution of a food product, such as cheese, as it falls by gravity from a feed hopper 22. As best shown in FIG. 6, paddle 18 is provided with a foot of triangular-shaped cross-section which sweeps the cheese along the porous member 16 and into openings 56. Preferably, the paddle 18 and the foot portion 67 is made of a plastic material, such as a polyethylene.

Figure 3:
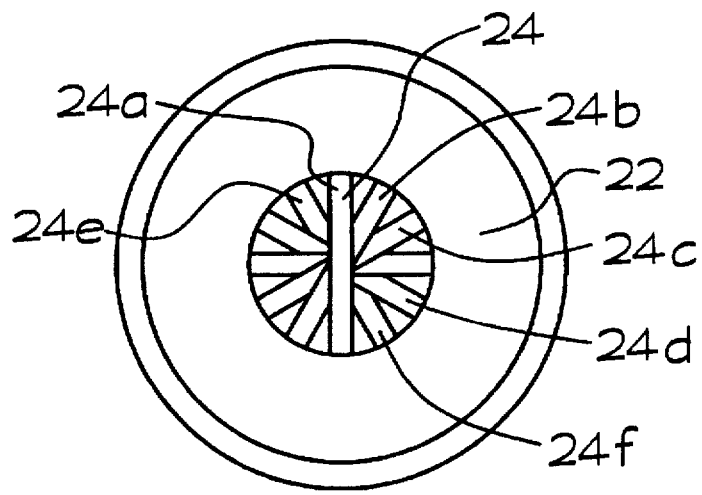
FIG. 3 is a top view of a feed hopper of the present invention of FIG. 1.

As shown in FIGS. 2 and 3, the food feed hopper 22 includes a plurality of breakers 24 disposed at preselected distances along the interior of the feed hopper 22. As shown, the breakers are elongated cylindrical rods identified by the numerals 24a, 24b, 24c, 24d, 24e and 24f. As shown in FIG. 2, the rods 24a–24f are spaced equal distance along the inner vertical walls of the feed hopper 22. As shown in FIG. 3, the breakers 24 are equally spaced around the inner surface of hopper 22 with rod 24a extending from the 12 O'clock to the 6 O'clock position; the rod 24b extending from the 1 O'clock to the 7 O'clock position; the rod 24c extending from the 2 O'clock to the 8 O'clock position; elongated rod 24d extending from the 3 O'clock to the 9 O'clock position;

elongated rod 24e extending from the 4 O'clock to the 10 O'clock position; and, elongated rod 24f extending from the 5 O'clock to the 11 O'clock position thereby placing the rods 24a–24f equal distance around the inner circumferential surface of the hopper 22. Moreover, in a preferred embodiment, since cleaning of the breaker bars 24 is necessary at periodic intervals to prevent cheese build-up, contamination, and the like, each breaker bar 24 is detachably mounted within feed hopper 22. As shown in FIG. 2, each breaker bar 24 is provided with a bolt head 70 on one end and is threaded on an opposite end to receive a wing-nut 72 thereon. Appropriately sized holes (not shown) are provided at selected locations along the feed hopper 22 to receive the breaker 24 therethrough.

As shown in FIGS. 1 and 2, the feed hopper 22 is mounted onto the gear housing 30 with an L-shaped bracket 44 and gear housing 30 is mounted onto one edge of the food spreader housing 12.

Also, as shown in FIGS. 1 and 2, apparatus 10 is mounted onto a stand 48 which includes a plurality of legs 50 which are attached to the outer surface of the food spreader housing 12. Each leg 50 sets upon a base member 52 which sets upon a flat surface, such as a table top. Spacing between the base members 52 is generally sufficient so that a pizza crust 80, or the like, which is shown in phantom lines in FIG. 2, may be placed directly under the porous plate 16. Preferably, a screen or other tray means are provided to receive the pizza crust thereon since different diameter sized pizza crusts may be used with the present invention, and these tray means catch for re-use the cheese falling outside of the pizza crusts. In a preferred embodiment, as shown in FIG. 1, a conveyor 74 having spaced elongated rollers 76 mounted transverse of the conveyor with a catch pan 78 thereunder. The tray 78 provides the means for catching and preserving for re-use the cheese overflow from the pizza crust.

Figure 4:
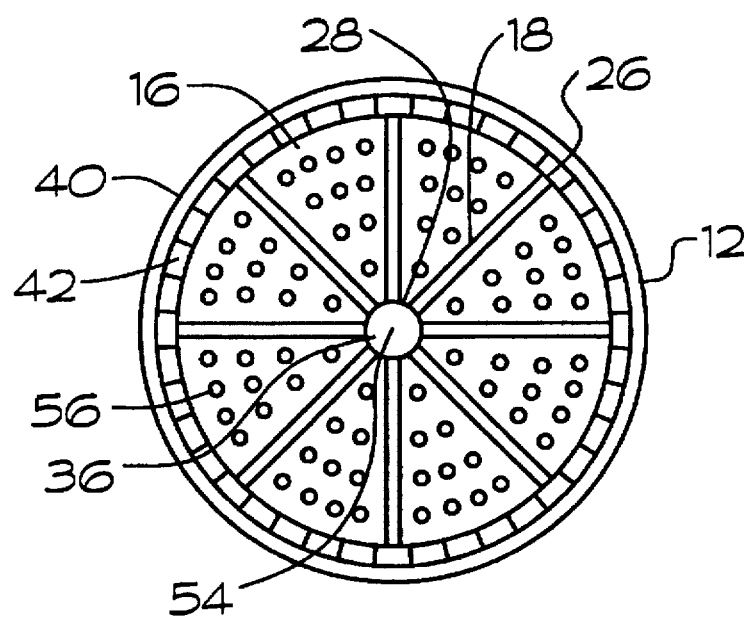
FIG. 4 is a top view of a food spreader housing of FIG. 1.

In FIG. 4 is shown the porous plate member 16 with the openings 56 disposed therethrough. Openings 56 are spaced uniformly over the porous member 16 at selected locations so the food product that falls onto the pizza crust is spaced evenly and at a constant volume over the entire surface of the product disposed directly under the plate 16.

Figure 5:
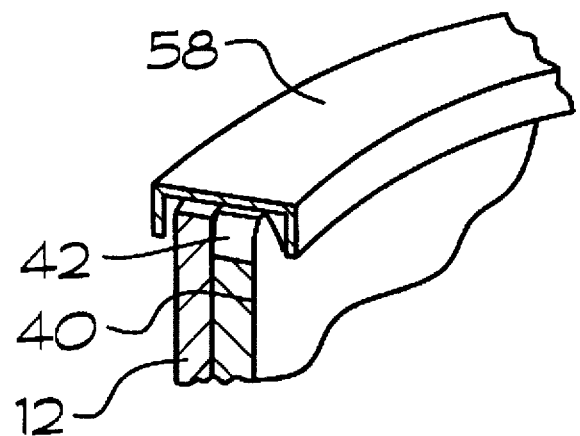
FIG. 5 is an enlarged partial sectionalized perspective view of one component of a preferred embodiment of the present invention; and, FIG. 6 is an enlarged perspective view of another component of a preferred embodiment of the present invention.

As shown in FIG. 5, as a safety feature, a channel shaped guard 58 is provided to cover the edge of the rotatable paddle ring 40 and particularly the teeth 42 of the ring 40.

In operation, pieces of cheese or another food product is fed into the feed hopper 22 with the cheese being forced downwardly across the breaker rods 24a–24f thereby breaking up the cheese into strips and chunks. The cheese dropping from the feed hopper 22 falls into the food spreader housing and as the pieces of cheese falls into the food spreader housing, handle 34 is turned thereby turning the paddle ring 40 and in turn the paddles 18. Falling cheese is then moved around the circumferential open bottom of the ring 40 onto the porous bottom 16 which includes a plurality of openings 56 of preselected size at preselected locations therein to evenly spread the cheese across the surface of a pizza crust. Different size openings 56 and different locations of openings 56 determine the type of cheese that is being added to the pizza crust. And, the size of the openings 56 determine the maximum diameter size of a piece of cheese that is added to the pizza crust.

It is realized that various changes in the details, materials of construction, steps and arrangement of parts which have been described herein are shown in the drawings in order to explain the nature of the invention, may be made by those skilled in the art without departing from the principals and scope of the invention as expressed in the claims appended hereto.

What is claimed is:

1. An apparatus for the uniform distribution of a food product over a surface comprising:

a food spreader housing spaced above a surface to receive a product, said housing having an open top of circular cross-section, a circumferential vertical wall, a flat porous bottom member and rotable vertically extending paddles mounted therein;

means to rotate said paddles; and, a food feed hopper having an open bottom of circular cross-section spaced above said open top of said spreader housing, said open bottom and said open top being in axial alignment and the circular cross-section of said open bottom having a surface area less than a surface area of said open top.

2. The apparatus of claim 1, said food feed hopper including food breakers therein.

3. The apparatus of claim 2, said food breakers being detachably mounted in said feed hopper.

4. The apparatus of claim 2, said breakers being elongated rods extending from one arcuate segment of said feed hopper to an opposite arcuate segment of said feed hopper.

5. The apparatus of claim 4, said breakers being spaced equal distance along a vertical axis.

6. The apparatus of claim 4, said breakers being spaced at equal arcuate distances around a circumference of said feed hopper.

7. The apparatus of claim 1, said rotatable paddles having an outer edge longer than an inner edge.

8. The apparatus of claim 7, said paddles having a bottom edge extending from said outer edge to said inner edge, said bottom edge being substantially horizontal.

9. The apparatus of claim 8, said bottom edge being spaced above said flat porous bottom member.

10. The apparatus of claim 1, said paddles having a foot of triangular-shaped cross-section.

11. The apparatus of claim 10, said foot being polyethylene.

* * * * *